No. 886,970. PATENTED MAY 5, 1908.
O. J. GONZALEZ.
WEEDER AND CULTIVATOR.
APPLICATION FILED NOV. 8, 1907.
2 SHEETS—SHEET 1.
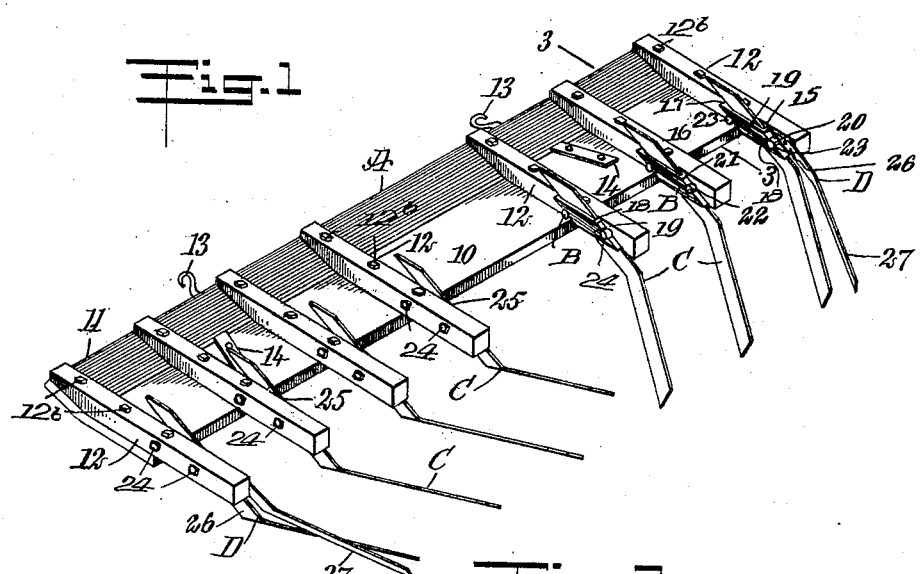
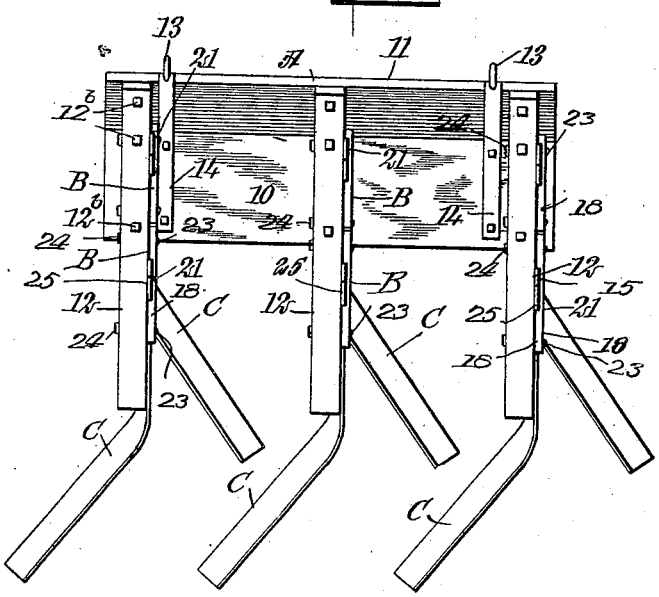
WITNESSES
INVENTOR
Ormiston J. Gonzalez
BY
ATTORNEYS No. 886,970. PATENTED MAY 5, 1908.
O. J. GONZALEZ.
WEEDER AND CULTIVATOR.
APPLICATION FILED NOV. 8, 1907.
2 SHEETS—SHEET 2.
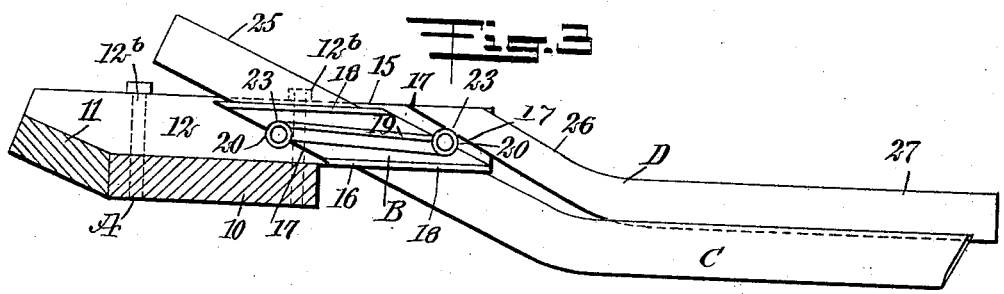
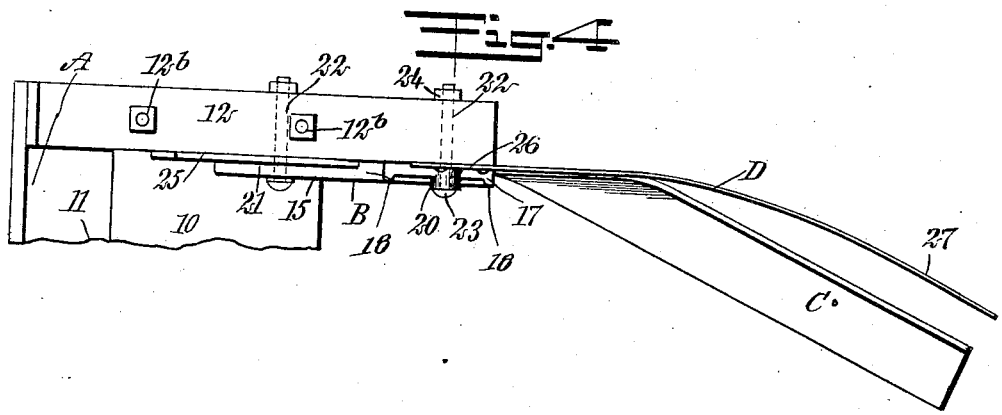
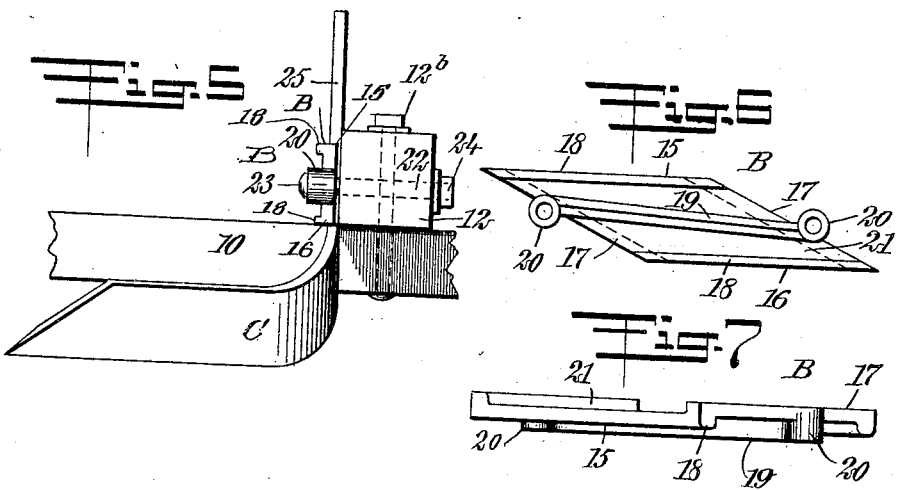
WITNESSES
INVENTOR
Ormiston J. Gonzalez
BY
ATTORNEYS

UNITED STATES PATENT OFFICE.

ORMISTON J. GONZALEZ, OF PALMS, CALIFORNIA.

WEEDER AND CULTIVATOR.

No. 886,970.  Specification of Letters Patent.  Patented May 5, 1908.

Application filed November 8, 1907. Serial No. 401,201.

*To all whom it may concern:*

Be it known that I, ORMISTON J. GONZALEZ, a citizen of the United States, and a resident of Palms, in the county of Los Angeles and State of California, have invented a new and useful Improvement in Weeders and Cultivators, of which the following is a full, clear, and exact description.

The purpose of the invention is to provide a very simple, durable and economic type of agricultural implement, that will combine in one device the functions of a cultivator and weeder, and to so construct the device that while cultivating the ground over which it is drawn it will destroy all weeds in its path without stopping or clogging, whether the weeds be one inch or two feet high, or growing scattering or thick and matted.

It is a further purpose of the invention to provide a device of the character described wherein the blades can be quickly and easily adjusted to cut any depth from one to six inches, and one that will operate successfully in almost all characters of soil and on any kind of weeds or grain, without the use of wheels, levers or other costly appliances, or change in the shape of the blades for regulating or maintaining a regular depth of cut; and wherein the same angularity of the blades is maintained to the plane of the surface passed over.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a perspective view of the improved device, the blades being shown turned in; Fig. 2 is a plan view of the device wherein the blades are arranged for special classes of work, being turned both inward and outward; Fig. 3 is an enlarged transverse section through the drag body of the machine, the section being taken practically on the line 3—3 of Fig. 1; Fig. 4 is an enlarged plan view of the part shown in Fig. 3; Fig. 5 is a rear view of a portion of the device illustrating the manner in which the blades are adjustably held; Fig. 6 is a front elevation of one of the clamps employed for the blades; Fig. 7 is a plan view of said clamp; and Fig. 8 is a plan view of one of the blades.

A represents the drag body of the device, which body may be of any suitable shape or material; in the drawings it is shown consisting of a rear flat section 10 and a forward inclined section 11. Cross beams 12 are secured to the upper face of the drag body A by means of suitable bolts $12^b$, as is shown in Figs. 1, 2, 3, 4, and 5, and these cross beams 12 may be of any desired length or material and of any desired arrangement; as for example, in Fig. 1 they are arranged in two series, one at each side of the center of the drag body, whereas in Fig. 2 they are shown arranged at equal distances apart, and in all cases the cross beams extend beyond the rear edge of the rear body section 10 to a predetermined extent, extending further to the rear in the construction illustrated in Fig. 2, than is necessary in the construction shown in Fig. 1. The body A is provided usually with hooks 13 at its forward portion to receive a suitable draft device, and these hooks are preferably made an integral portion of straps 14 that are secured to the body A in any approved manner.

In connection with each cross beam 12, a clamp B is employed. This clamp B is substantially diamond-shaped in front elevation, as is shown in Figs. 3 and 6, comprising parallel upper and lower edges 15 and 16 and parallel end edges 17, the latter edges being inclined from the top of the clamp downward and outward. Each of the clamps B practically correspond to the width of a cross beam 12 at its outer or projecting end portion, since the clamps B are attached to said portions of the cross beams and are located usually at the inner side faces of said beams but as shown in Fig. 2, one or more clamps may be located at the outer sides of the beams. Each clamp B is preferably provided with a reinforcing upper and lower rib 18, formed upon its outer face and a central wider rib 19 also located upon its outer face, but the central rib 19 extends beyond the ends 17 of the clamp and terminates at said projecting portions in cylindrical sections 20, having apertures therein for the passage of bolts 22 to be hereinafter referred to, and in the inner face of each clamp B a recess 21 is formed having a shape corresponding to the shape of the clamp proper, as is shown in dotted lines in Fig. 6, and in full lines in Fig. 7, namely the opposing end portions of the said recess 21 are inclined at the top downwardly and outwardly.

As has been stated, a clamp is located upon the inner end of the projecting portion of each cross beam and is secured in position by passing the bolts 22, above referred to, through the apertured projections 20 and through the cross beams, each bolt being provided with a head 23 that engages with the outer face of the extension 20 through which the bolt is passed, and each bolt is further provided at its opposite end with a nut 24 or like fastening device. It is evident that the clamps B can be adjusted to any point desired upon the beams by producing series of apertures in the beams to receive the fastening bolts of the clamps.

In connection with each cross beam 12 a blade C is employed. These blades are constructed of flat steel and need not be very heavy, and are arranged to stand at an obtuse angle to the ground, their cutting edges lying on the ground or burying themselves below the surface of the ground according to the adjustment of the blades. Each blade C is provided with a preferably integral shank 25, and these shanks 25 are likewise flat or have a corresponding cross section to the cross section of the blades C, but these shanks 25 are at an acute angle to the blades and have an angle corresponding to the angle or inclination of the recesses 21 in the clamps B, since the shanks of the blades are passed up through the recesses 21 in the clamps and are held tightly to the cross beams by tightening up the clamp bolts 22. These blades C may have any desired arrangement, as for example, they may have an inclination through the ends of the body A in direction of the center, as is shown in Fig. 1, and by loosening the clamp bolts 22 the shanks of the blades may be raised or lowered to cause them to enter the ground to a greater or lesser extent.

On the inner face of each end cross beam 12, particularly in the form of the device shown in Fig. 1, a fender D is produced which is correspondingly formed to the blades C, comprising a scraping section 27 which corresponds to the said blades, and a shank 26 corresponding to the shank 25 of the blade C. The shanks of the fenders D are secured by bolts or otherwise directly to the inner faces of the end cross beams at their extreme rear end portions, as is illustrated in Fig. 1, and likewise in Figs. 3 and 4. The scraping members 27 of the fenders cross the upper edges of the outer blades C, extending with more of an outward inclination, as is particularly shown in Fig. 1, consequently the scrapers 27 are at a less acute angle to their shanks 26 than are the blades C to their shanks 25. These fenders in the operation of the device serve to push the cut and loose weeds toward the central portion of the device, thus leaving a clear margin for the implement to turn.

In the construction shown in Fig. 2, two blades C are employed in connection with each cross beam 12, and two clamps B are employed for each cross beam 12, arranged one behind the other. In this arrangement the shanks of one set of blades are passed through the recesses 21 of the rearmost clamp and are made to incline in one direction, while the shanks of a second set of blades are passed through the recess 21 of the forward clamps and the latter blades are made to face in an opposite direction. This arrangement of blades is very important for some classes of work.

The blades can be readily sharpened, and can be made quite thin and yet be strong and elastic, and are adapted for use in connection with almost any character of soil, and furthermore they are capable of lightness of draft.

Having thus described my invention, I claim as new and desire to secure by Letters Patent,—

1. In a weeder and cultivator, a drag frame, transverse beams projecting from the rear edge of the frame and arranged in sets, one set at each side of the center of the frame, cutting blades attached to the side faces of the beams, which blades have a transverse inclination in direction of their cutting edges, and shanks integral with the blades but at an obtuse angle thereto, both the blades and their shanks being rectangular in cross section, the blades of one set of beams being at an angle to the blades of the other set of beams, and a fender secured to each end beam, each fender consisting of a blade extending across the cutting blade and a shank at an acute angle to the blade.

2. In a weeder and cultivator, the combination with the drag frame, beams extending rearward from the frame, clamps secured to the side faces of the beams, which clamps have inclined recesses therein, and means for tightening and loosening said clamps, of blades having a transverse inclination in direction of their cutting edges, and shanks integral with the blades, but bent at an obtuse angle thereto, both the blades and their shanks being rectangular in cross section, the shanks of the blades being entered into and held in the recesses of said clamps, and a fender at each end of the frame and extending across the blade adjacent thereto.

3. In a weeder and cultivator, the combination with a drag body, cross beams attached to the body and extending rearwardly therefrom, and a clamp located on a side face of the projecting portion of each cross beam, each clamp being substantially diamond-shaped in front elevation, its ends inclining from the top downward and outward in parallelism, each clamp being provided with a recess upon its inner face, the end walls thereof having a corresponding inclination to the end portions of the clamp, and means for tightening and loosening the clamps upon their carrying beams, of a blade for each clamp, each blade having a transverse inclination from its back in direction of its cutting edge, the cutting edges of the said blades being at an obtuse angle to the ground, and a shank for each blade, which shanks are at an acute angle to the blades, both shanks and blades having the same cross sectional shape, the shanks being passed upward through the recesses in the said clamps, and a fender at each end of the body, which fenders consist each of scraping blade adapted to extend outward and rearward across the end cutting blade, and a shank for each scraping blade, said shanks being at an acute angle to the blades and integral therewith, the shanks of the fenders being secured to the end cross beams of the implement.

In testimony whereof I have signed my name to this specification in the presence of two subscribing witnesses.

ORMISTON J. GONZALEZ.

Witnesses:
    CLYDE H. SIMMONS,
    HORACE B. GARRISON.